United States Patent [19]
Kline et al.

[11] Patent Number: 5,453,226
[45] Date of Patent: * Sep. 26, 1995

[54] CURING OF COMPOSITE MATERIALS USING EXTENDED HEAT TRANSFER MODELS

[75] Inventors: Ronald A. Kline; M. Cengiz Altan, both of Norman, Okla.

[73] Assignee: The Board of Regents of the University of Oklahoma, Norman, Okla.

[ * ] Notice: NOTE-DISCLAIMER The portion of the term of this patent subsequent to May 4, 2010 has been disclaimed.

[21] Appl. No.: 135,873

[22] Filed: Oct. 13, 1993

Related U.S. Application Data

[63] Continuation-in-part of Ser. No. 45,548, Apr. 8, 1993, abandoned, which is a continuation of Ser. No. 831,608, Feb. 5, 1992, Pat. No. 5,207,956.

[51] Int. Cl.$^6$ ................................................ B29C 35/04
[52] U.S. Cl. .................... 264/40.1; 264/40.6; 264/66; 425/135; 425/143
[58] Field of Search .................. 264/40.1, 40.6, 264/236, 347, 66; 425/143, 144, 149, 29, 30, 160, 135; 364/473, 476

[56] References Cited

U.S. PATENT DOCUMENTS

| | | | |
|---|---|---|---|
| 4,455,268 | 6/1984 | Hinrichs | 264/23 |
| 4,515,545 | 5/1985 | Hinrichs | 425/143 |
| 4,551,807 | 11/1985 | Hsich | 264/40.1 |
| 4,559,810 | 12/1985 | Hinrichs et al. | 73/54 |
| 4,806,292 | 2/1989 | DeLacy | 264/40.1 |
| 4,810,438 | 3/1989 | Webster et al. | 264/40.1 |
| 4,819,177 | 4/1989 | Jurgensen | 264/40.1 |
| 5,031,457 | 7/1991 | Kline | 73/597 |
| 5,207,956 | 5/1993 | Kline et al. | 264/40.6 |
| 5,345,397 | 9/1994 | Handel et al. | 264/40.1 |

OTHER PUBLICATIONS

Springer, "Resin Flow During the Cure of Fiber Reinforced Composites", J. Composite Materials, 16:400–410 (1982).
Lee, Loos & Springer, "Heat of Reaction, Degree of Cure, and viscosity of Hercules 3501–6 Resin", J. Composite Materials, 16:510–520 (1982).
Loos & Springer, "Curing of Epoxy Matrix Composites", J. of Composite Materials, 17:135–169 (1983).
Burmeister, "Convective Heat Transfer", John Wiley & Sons, Inc., (1983).
Hsiao & Kline, "the Measurement of Viscoelastic Moduli Using An Ultrasonic Spectroscopy Technique", 1984 Ultrasonics Symposium, pp. 443–446 (1984).
Kline, "Measurement of Attenuation and Dispersion Using An Ultrasonic Spectroscopy Technique", J. Acoust. Soc. Am., 76(2):498–504 (1984).
Gutowski, "A Resin Flow/Fiber Deformation Model for Composites", SAMPE Quarterly, 16(4):58–64 (1985).
Dave, Kardos & Dudukovic, "A Model For Resin Flow During Composite Processing: Part 1—General Mathematical Development", Polymer Composites, 8(1):29–38 (1987).
Dave, Kardos, & Dudokovic, "A Model For Resin Flow During composite Processing: Part 2—Numerical Analysis for Unidirectional Graphite/Epoxy Laminates", Polymer Composites, 8(2)123–132 (1987).

(List continued on next page.)

*Primary Examiner*—Jill L. Heitbrink
*Attorney, Agent, or Firm*—Dunlap Codding

[57] ABSTRACT

The present invention is a method for controlling the curing process of a composite material part in a curing vessel such as an autoclave. The method relies on the comparison of actual part parameter values to predicted part parameter values wherein the predicted values are obtained from computer simulations of the cure cycles using convective heat transfer, thermo-chemical, cure kinetics, resin flow and viscosity analytic models. The invention provides a methodology for the continuous selection and updating during the cure process of new optimal cure cycles from sets of cure cycles in response to actual material behavior during the curing process. An extended heat transfer model coupled to the thermo-chemical model accounts for convective heat transfer within curing vessel during the curing process.

15 Claims, 2 Drawing Sheets

OTHER PUBLICATIONS

Kline & Chen, "Ultrasonic Technique for Global Anisotrophic Property Measurement in Composite Materials", Materials Evaluation–46, pp. 986–992 (1988).

Kline, "Wave Propagation in Fiber Reinforced Composites for Oblique Incidence", J. of Composite Materials, 22:287–302 (Mar. 1988).

Kline, Madaras & Boltz, "Nondestructive Characterization of Elastic Anisotrophy in Carbon–Composites", Nondestructive Evaluation: NDE Planning and Application. A Symposium of the Am. Soc. of Mech. Engr., pp. 135–140 (1989).

Kline & Kulathu, "On–Line Monitoring of composite Prepreg Fabrication", Presented at the Winter Annual Meeting of the Am. Soc. of Mech. Engr., Atlanta, Ga. (Dec. 1991).

Kline, "Ultrasonic Characterization of Composite Microstructure", Unpublished.

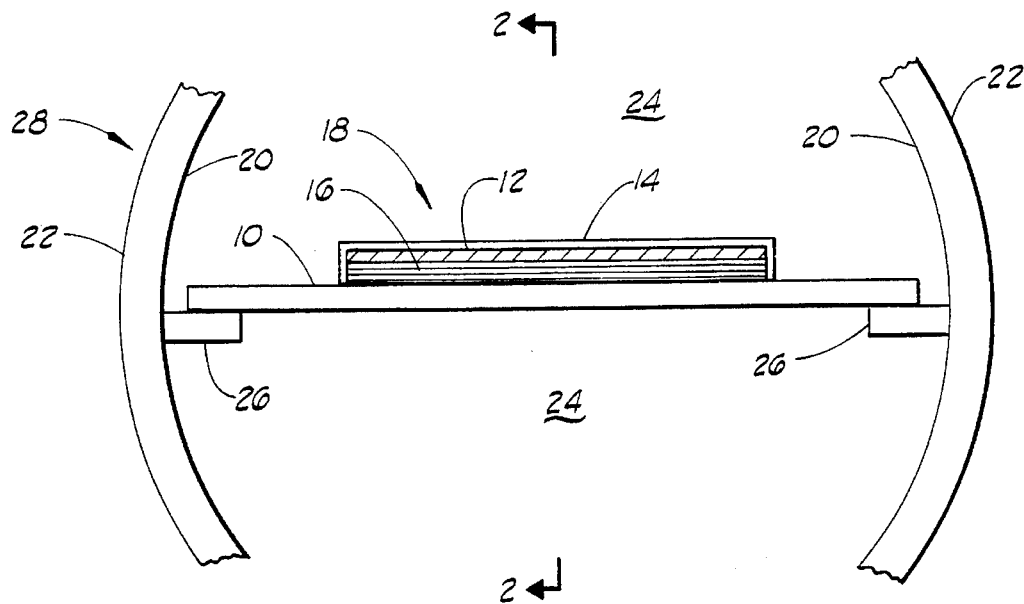
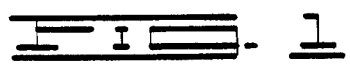
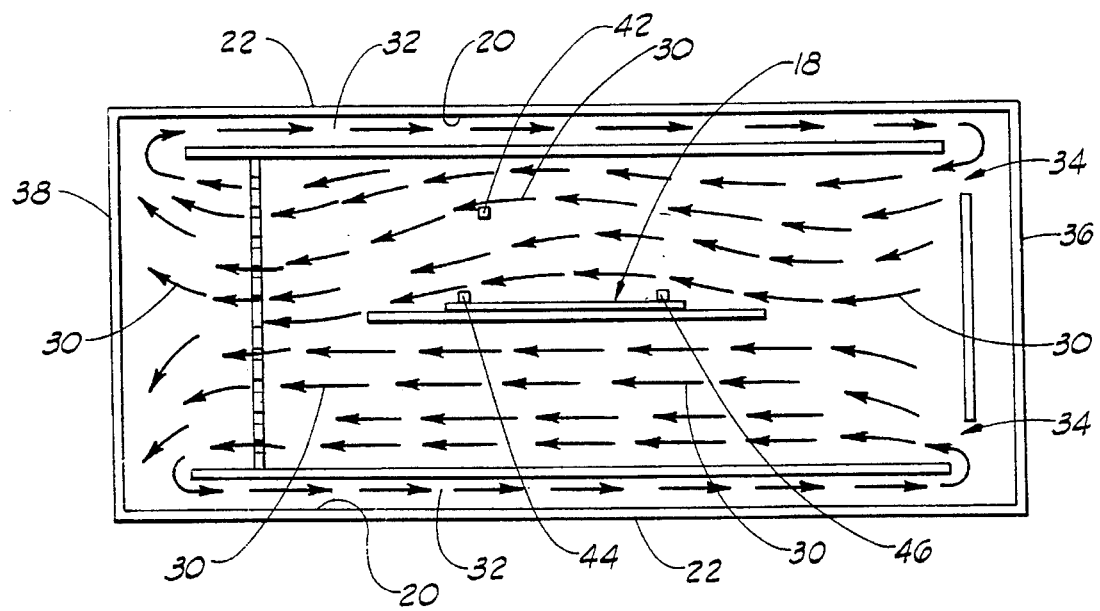
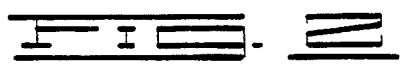

CURING OF COMPOSITE MATERIALS USING EXTENDED HEAT TRANSFER MODELS

CROSS REFERENCE TO RELATED APPLICATIONS

The present application is a continuation-in-part of U.S. Ser. No. 08/045,548 filed Apr. 8, 1993, now abandoned which is a continuation of U.S. Ser. No. 07/831,608, filed, Feb. 5, 1992 now U.S. Pat. No. 5,207,956, issued to Kline et al. on May 4, 1993.

BACKGROUND

The present invention relates to the process of controlling the curing of composite materials and, more particularly but not by way of limitation, to the computer controlled selection of cure cycles during the curing process of composite materials in a curing vessel such as an autoclave.

In recent years there has been dramatic growth in the utilization of polymers for a wide variety of applications. As with any material, one must consider carefully the issues of processing and quality assurance for the fabricated component. While a great deal of experience has been developed for metallic parts, there is much less information available for composite laminates (wherein the term "composite" refers to any thermosetting material constructed of at least two constituent materials). Of particular concern is the complexity of the fabrication process and susceptibility of these structures to both the same types of bulk defects that are seen in conventional materials (such as voids, porosity, and inclusions) as well as an array of more subtle defects (such as overcure/undercure, moisture degradation, weakly bonded interfaces and delamination) unique to composites. Accordingly, new techniques must be available to insure reliability. As performance is dependent upon processing conditions, considerable benefits will result from a method integrating nondestructive evaluation (NDE) into the manufacturing phase.

One example of a composite is graphite/epoxy laminate. Graphite/epoxy is the most commonly used material system and the preparation of vacuum bag layup and application of autoclave cure cycle follows fairly well-established procedures. Nonetheless, the design of a cure cycle is still generally performed in an ad hoc fashion after numerous trials. Currently, neither rigorous cure models nor real time nondestructive tests are utilized to any great extent in the composites industry. The nondestructive testing of a part after the fabrication is used today as the principal means of quality assurance. Hence, the ability to analyze the fabrication of graphite/epoxy systems with real time interactive NDE in conjunction with fundamental cure models would be a significant contribution to the existing science of composite manufacturing.

Nondestructive (particularly ultrasonic) test methods offer a powerful means for characterizing material microstructure. Historically, the use of these techniques has been basically confined to gross defect identification based on the large impedance (hence acoustic reflections) differences between flawed and unflawed materials. For metals, this approach has been acceptable because structurally critical flaws (cracks, voids, inclusion) are readily detected with this approach. Composites, while subject to many of the same gross flaws as metals, are susceptible to other significant flaws as well. Because composites are an engineered microstructure, defects in composites are often significantly more subtle than the gross defects described above and are virtually undetectable with conventional approaches. Typically, these defects are in the number, type, distribution and efficiency of the microconstituents of the composite. Unfortunately, the bulk of composite NDE today is performed using the amplitude based techniques adapted from metals testing and which are totally inappropriate for finding these critical defects.

Most of the quality control/NDE test procedures currently being used evolve from previous experience in the metals and plastic industries. Most companies divide their activities into quality assurance and nondestructive testing with the bulk of the quality assurance activity devoted to qualifying incoming material to insure that it meets established standards and NDT (Non-Destructive Testing) for defect identification. However, the bulk of the tests being performed suffer from one or more of several important drawbacks:

They are destructive.

Only a limited number of samples are tested.

They are insensitive to certain critical changes in microstructure.

They are performed after fabrication where little or nothing can be done to salvage a flawed component.

Considerable benefits will accrue from a thorough integration of advanced nondestructive measurement science techniques into the production process. Potential benefits are available in the following areas:

Reduced Risk. In a typical aerospace operation, it is not unusual for a batch of composite material to cost in excess of fifty thousand dollars. A critical failure in the process may cause the entire batch to be scrapped.

Reduced Process Time and Processing Steps. One of the optimization factors driving the control process is to minimize the time required to process the part. The process time can be reduced by up to one half the original time in some cases. Because of the uncertainty in the cure status of materials, several steps are often added to the process to assure, for example, that gases have been removed prior to heating the resin above its cure initiation temperature. Some of these steps could be combined if the cure status were known.

Improved Process Capability. The ability to process materials here-to-for considered too difficult to manage, opens a number of options to the designer. If it is possible to build a part which previously could not be built due to the technological limitations, there is significant economic potential both for a new product and for the development of a competitive edge.

Improvement in Quality. The ability to sense and predict the cure status of the resin allows the manufacturer to constantly adjust the process for optimum part quality. With previous technologies, the composite producer has had only limited means to determine and moderate the cure or consolidation status of the part.

While composites continue to grow in their importance in virtually every facet of the aerospace industry, the bulk of the research activity has been devoted to the development of improved fiber and matrix systems (materials science) and understanding the mechanics of anisotropic, laminated structures (mechanics). However, the research in the processing area, where both materials and mechanics expertise are required, has been limited. While there has been some success in process modeling, little use has been made of this information to date in developing interactive process control systems for composite manufacture. Most current approaches rely upon empirical relations among the pertinent variables (temperature, pressure, degree of cure, viscosity) rather than a unified model of material behavior based on fluid/solid mechanics and heat transfer principles. However, these techniques are limited to the comparison of real time cure characteristics to a preset cure cycle profile which does not change during the curing process (see U.S. Pat. Nos. 4,455,268, 4,515,545, and 4,559,810 issued to Hinrichs and Thuen).

A significant improvement in existing process control methodology would result from incorporating suitable analytic models. The predictions of future behavior of the cure process could then be used to make decisions about the future course of the cure process. Therefore, the object of the present invention is to provide a methodology employing analytic models for continuously selecting new optimal cure cycles during the curing process in response to actual material behaviors which occur over time within the composite part during the curing process.

BRIEF DESCRIPTION OF THE DRAWINGS

FIG. 1 is an end sectional view of a curing vessel having a curing assembly supported therein.

FIG. 2 is a side view of the curing vessel and curing assembly of FIG. 1 showing the direction of air flow within the curing vessel.

SUMMARY

Figure 3:
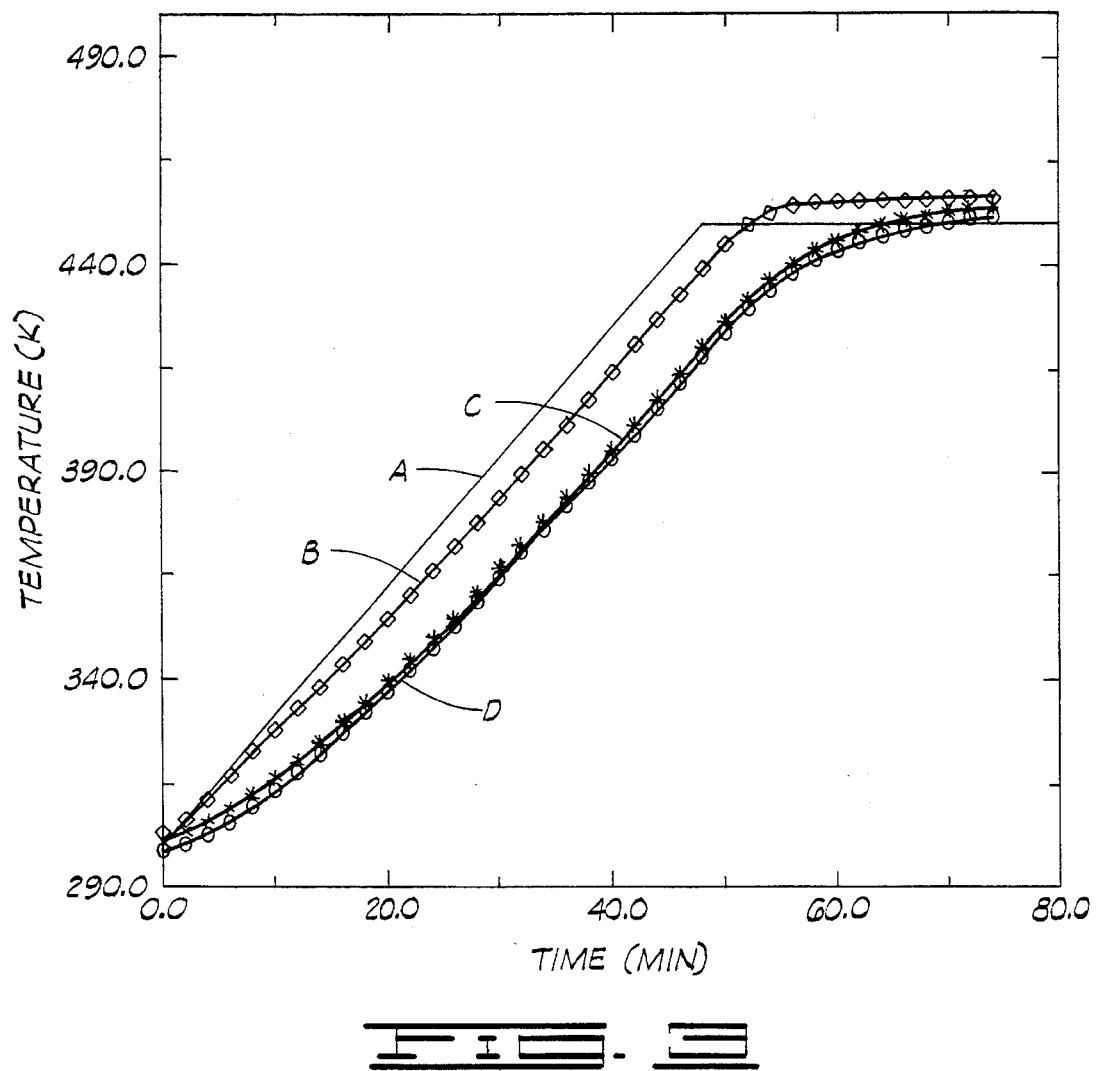
FIG. 3 is a graph showing actual temperatures measured at three locations within a curing vessel during a curing process.

The present invention is a method for controlling a curing process for curing a composite material part in a curing vessel. The method has the following steps. First, the composite material part is placed in the curing vessel. An initial cure cycle is selected. The curing process of the composite material part is begun by heating a gas within the curing vessel in accordance with the initial cure cycle. An actual part temperature of the part is measured during the curing process. A pressure is measured within the curing vessel during the curing process. The convective heat transfer between the heated gas within the curing vessel and the composite part is accounted for. At least one additional real part parameter value is directly measured during the curing process. The additional real part parameter value is compared to a predicted part parameter value determined from a predictive analytic model. A new cure cycle is selected periodically during the curing process when the additional real part parameter value falls outside of a predetermined acceptable range about the predicted part parameter value. Finally the curing process is adjusted in accordance with the new cure cycle.

Further, the step of selecting a new cure cycle may comprise comparing the actual part temperature to a predicted maximum part temperature and selecting the new cure cycle when the actual part temperature falls outside of a predetermined acceptable range about the predicted maximum part temperature. Additionally, the real part parameter value may further comprise a measured quantity related to actual degree of cure of the part and the predicted part parameter value may further comprise a predicted degree of cure.

Also, the real part parameter value may further comprise a measured quantity related to actual viscosity of the part and the predicted part parameter value may be a predicted viscosity. And, the real part parameter value may further comprise a measured quantity related to the actual number of compacted plies and the predicted parameter part value may be a predicted number of compacted plies.

DESCRIPTION OF THE INVENTION

The present invention comprises an extension the computer-controlled curing process disclosed in U.S. Pat. No. 5,207,956 issued to Kline et al., on May 4, 1993, entitled "Computer-Controlled Method for Composite Curing", which is hereby specifically incorporated herein by reference. The present invention combines a model for extended heat transfer within the autoclave with a thermo-chemical model for determining the temperature profile of a composite part during the cure cycle thereby improving the predictive capability of a cure-control strategy such as that disclosed in U.S. Pat. No. 5,207,956. The new model considers the fluid flow and the associated energy transfer between the flowing fluid and the composite part to be cured in the autoclave where the fluid is a gas, for example, air. When coupled with the thermo-chemical model of the composite curing strategy disclosed in U.S. Pat. No. 5,207,956, the additional model improves the accuracy of the curing cycle predictions thereby reducing the magnitude and the frequency of the corrections imposed on the selected cure cycles.

The present invention is a method for controlling a curing process for curing a composite material part in a curing vessel. The method has the following steps. First, the composite material part is placed in the curing vessel. An initial cure cycle is selected. The curing process of the composite material part is begun by heating a gas (preferably air or nitrogen; whenever the term "air" is used herein, it will be understood that this refers to any gas which may be used in a composite curing process) within the curing vessel in accordance with the initial cure cycle. An actual part temperature of the part is measured during the curing process. A pressure is measured within the curing vessel during the curing process. The convective heat transfer between the heated gas within the curing vessel and the composite part is accounted for. At least one additional real part parameter value is directly measured during the curing process. The additional real part parameter value is compared to a predicted part parameter value determined from a predictive analytic model. A new cure cycle is selected periodically during the curing process when the additional real part parameter value falls outside of a predetermined acceptable range about the predicted part parameter value. Finally the curing process is adjusted in accordance with the new cure cycle.

Further, the step of selecting a new cure cycle may comprise comparing the actual part temperature to a predicted maximum part temperature and selecting the new cure cycle when the actual part temperature falls outside of a predetermined acceptable range about the predicted maximum part temperature. Additionally, the real part parameter value may further comprise a measured quantity related to actual degree of cure of the part and the predicted part parameter value may further comprise a predicted degree of cure.

Also, the real part parameter value may further comprise a measured quantity related to actual viscosity of the part and the predicted part parameter value may be a predicted viscosity. And, the real part parameter value may further comprise a measured quantity related to the actual number of compacted plies and the predicted parameter part value may be a predicted number of compacted plies.

As noted above, the present invention comprises an extension of the method disclosed in U.S. Pat. No. 5,207,956 for controlling a curing process of a composite material part in a curing vessel such as an autoclave. Overall, the method comprises the selection of a new cure cycle periodically during the curing process which serves as a basis for adjusting the curing process. The selection process employs predictive analytic models capable of simulating the behavior of the cure process and predicting maximum temperature, degree of cure, viscosity and compaction of plies of the part over time. The models used are a thermo-chemical model, a cure kinetics model, a viscosity model and a resin flow model. The thermo-chemical model provides a theoretical temperature distribution vs. time curve within the composite part. The cure kinetics model provides a theoretical degree of cure time curve. The resin flow model provides a theoretical viscosity vs. time curve. The resin flow model provides a theoretical number of compacted plies vs. time curve. A set of initial cure cycles is used to provide initial and boundary conditions for the solution by computer of the series of cure process models.

In the preferred embodiment of the present invention, the thermo-chemical, cure kinetics, resin flow and viscosity models are those described in W. Lee, A. Loos and G. Springer, "Heat of Reaction, Degree of Cure, and Viscosity of Hercules 3501-6 Resin," *J. Composite Materials*, Vol. 16, pp. 510–520, (Nov., 1982) which is specifically hereby incorporated herein by reference and in A. Loos and G. Springer, "Curing of Epoxy Matrix Composites," *Journal of Composites*, Vol. 17, pp. 135–169 (1983), which is specifically hereby incorporated herein by reference. However, other embodiments of the present invention may rely on alternate or improved versions of analytic models which also describe the thermo-chemical, cure kinetics, degree of cure and resin flow of materials under the conditions of the curing process.

Examples of articles which describe other models which may be used as analytic models in the present invention or which include discussion of methodologies which can be utilized in the present invention include: G Springer, "Resin Flow During the Cure of Fiber Reinforced Composites," *J. Composite Materials*, Vol. 16, pp. 400–410, (Sept. 1982); T. Gutowski, "A Resin Flow/Fiber Deformation Model for Composites," *SAMPE Quarterly*, Vol. 16(4), pp. 58–64 (July 1985); R. Dave, J. Kardos and M. Dudukovic, "A Model for Resin Flow During Composite Processing: Part 1 —General Mathematical Development," *Polymer Composites*, Vol. 8(1), pp. 29–38, (Feb., 1987); R. Dave, J. Kardos, and M. Dudukovic, "A Model for Resin Flow During Composite Processing Part 2: Numerical Analysis for Unidirectional Graphite/Epoxy Laminates, " *Polymer Composites*, Vol. 8(2), pp. 123–132 (April 1987); R. A. Kline and Z. T. Chen, "Ultrasonic Technique for Global Anisotropic Property Measurement in Composite Materials, " *Materials Evaluation*, Vol. 46, pp 986–992, (June, 1988); R. A. Kline, "Wave Propagation in Fiber Reinforced Composites for Oblique Incidence," *J. of Composite Materials*, Vol. 22, pp. 287–303 (March 1988); R. A. Kline and R. V. Kulathu, "On-Line Monitoring of Composite Prepreg Fabrication," Paper presented at the Winter Meeting of the A. Soc. of Mech. Engr., Atlanta, Ga., (Dec. 1991); and R. A. Kline, "Ultrasonic Characterization of Composite Microstructure, " unpublished. The articles and other references listed herein are hereby specifically incorporated herein by reference.

The thermo-chemical model is used to derive a predicted temperature distribution vs. time curve (FIG. 5 in U.S. Pat. No. 5,207,956) for a given cure cycle. This curve is used to predict if the internal temperature generated within the composite part of the curing assembly under the conditions of that given cure cycle will exceed a predetermined maximum acceptable temperature at any location in that part during the curing process.

However, a deficiency of present cure control strategies is that thermo-chemical models currently used to calculate the predicted temperature distribution within the composite part assume that the autoclave temperature is equal to the surface temperature of the composite part. This assumption neglects the presence of the tool-plate upon which the composite material is supported within the autoclave and the bleeder which rests upon the composite to soak up excess resin. The thermo-chemical model also assumes an infinite heat transfer coefficient h therefore neglecting energy transfer from air to curing assembly or vice-versa by convection.

When the assumptions (e.g., no convective heat transfer) and boundary conditions upon which the thermo-chemical model is based are incorrect, the predicted temperature distribution will be in error thus leading to potential errors in the curing process. By including a model which accounts for convective heat transfer, the predictive capability of the thermo-chemical model will be improved thereby improving cure cycle selection process and the performance of the entire computer controlled curing strategy.

Operational Details

In order to cure a composite material, a tool-plate 10, bleeder 12, vacuum bag 14, and the composite part 16, i.e., prepregs of the composite material, are assembled to form a curing assembly 18 within a curing vessel, such as an autoclave, as shown in FIG. 1. The tool-plate 10, bleeder 12, vacuum bag 14 and composite part 16 comprise the bulk of the curing assembly 18. However, it will be understood that there may be other necessary materials such as teflon sheets, which are not shown in the FIG. 1 which also comprise the curing assembly 18. Conventional autoclaves or other curing vessels are usually of circular cross-section having an inner surface 20, an outer surface 22 and an interior space 24. The tool-plate 10 is usually supported upon a pair of narrow rails 26 within an autoclave 28. After the curing assembly 18 is placed into the autoclave 28 and the autoclave 28 is closed, a curing cycle is initiated. Initially, the curing assembly 18 is heated within the curing vessel 28 by air which is usually heated by electric heaters (not shown). Fans circulate the heated air within the interior space 24 of the autoclave 28. Under such conditions, the flow is nearly unidirectional and laminar where chaotic or turbulent air flow is not expected. A simple diagram showing the interior space 24 of the autoclave 28 and the air flow directions 30 are shown in FIG. 2. Heated air is circulated via air conduits 32 through air inlets 34 at a front end 36 of the autoclave 28 toward a rear end 38 of the autoclave 28. Air is thus caused to flow over and under the curing assembly 18.

During the initial phases of the cure cycle, the energy transfer in the form of heat takes place in the direction of from the heated air to the cure assembly 18. Later, depending on the material chemistry and the curing kinetics, the heated composite part material 16 may initiate an exothermic reaction leading to higher temperatures within the composite material 16 than the temperatures within the air of the interior space 24. The basic mechanism of heat transfer between the curing assembly 18 and the surrounding air can be explained by the principles of convective heat transfer which characterize the energy exchange and interaction between a solid surface (the cure assembly surface) and an adjacent moving fluid (the air). Such principles are well known to those of ordinary skill in the art. Further explanation of the principles of convective heat transfer can be found in L. C. Burmeister, "Convective Heat Transfer" John Wiley & Sons, Inc., 1983. The behaviors of the air flow and temperature distribution throughout the flowing air will determine how the curing assembly 18 is heated or cooled.

The heat transfer coefficient h (also referred to as film coefficient, or film coefficient of heat transfer, and well known to those of ordinary skill in the art) is defined by the relation $$q = h(T_w - T_\infty) \tag{1}$$

where q is the heat transfer rate per unit area (i.e., also referred to as heat flux), $T_w$ is the temperature of the solid surface, and $T_\infty$ is the fluid temperature away from the solid surface (i.e., $T_\infty$ represents the fluid temperature which is unaffected by the presence of the solid boundary). Therefore, use of an infinite heat transfer coefficient value assumes that the wall temperatures and the fluid temperatures are equal to each other. In a curing procedure, this is interpreted as assuming that the temperature of the surface of the curing assembly 18 is equal to the temperature of the air within the autoclave 28. However, since the principles of convective heat transfer may be used to estimate the value of h to be anywhere between 5–50 W/m²K, such an assumption may lead to significant errors. Furthermore, it is well known that the value of heat transfer coefficient is non-uniform over the surface of the solid body (i.e., in the present case, the curing assembly 18). In light of the inaccuracies of these assumptions, it was considered that composite surface temperatures measured during the curing of curing assembly 18 using thermocouples located on the surface of the composite material would be significantly different from temperatures predicted by the thermo-chemical models. Experiments were conducted to investigate this potential discrepancy.

Experimental Procedures and Results

An autoclave chamber containing a curing assembly 18 supported on rails 26 within the chamber, and the locations of the thermocouples 42, 44 and 46 were positioned on the surface of the curing assembly 18 and within the interior space 24 of the autoclave 28 as shown in FIG. 2. Temperatures recorded over time by thermocouples 42–46 are shown in FIG. 3. The programmed autoclave temperature cure cycle is labeled "A" on FIG. 3. The curve showing temperatures measured by thermocouple 42 in the interior space 24 is labeled "B". The curve showing temperatures measured by thermocouple 44 on the surface of the curing assembly 18 is labeled "C". The curve showing temperatures measured by thermocouple 46 on a second position on the surface of the curing assembly 18 is labeled "D". FIG. 3 shows that the programmed autoclave temperatures A, the autoclave air temperature B and the surface temperature of the parts at two different locations, C and D, are much different. The discrepancies between these measured temperatures and the temperatures predicted by the thermo-chemical model could generate an excessive number of modifications of the selected cure profiles determined by the selection algorithm described in U.S. Pat. No. 5,207,956. The experimental results indicate that by coupling an analytical model for the air flow and heat transfer within the curing chamber with the thermo-chemical model, error level in the predictions can be reduced, thereby improving the accuracy of numerical simulations of the cure cycle.

Implementation of the Extended Heat Transfer Model

The numerical solution and implementation of the extended heat transfer model are carried out as follows.

Step 1: Determination of Air Flow Kinematics

For the given cure assembly, the flow kinematics (i.e., velocity components, flow streamlines, vorticity vector, etc.) are determined. The inlet velocity of the air can be determined from the specifications provided with the autoclave. For example, if the volume flow rate of the air is provided, based on the diameter of the curing chamber, the average air velocity can be obtained. Therefore, a uniform air velocity can be specified at the inlet of the flow domain (i.e., the curing chamber). The conventional boundary conditions are so-called no-slip boundary conditions on the side walls of the interior of the autoclave and fully-developed boundary conditions at the downstream end (i.e., at the other end on the curing chamber after the flow is past the composite assembly). The flow characteristics within the autoclave are assumed to remain unchanged throughout the cure cycle so that the flow variables such as the velocity field can be considered as steady (i.e., independent of time). Under such conditions the governing equations for the air flow and the numerical solution techniques associated with these equations are well established in the field (see, for example T. M. Shih, "Numerical Heat Transfer", Hemisphere Pub Co., 1984; and M. N. Ozisik, "Heat Transfer: Basic Approach", McGraw-Hill, Inc., 1985)

Step 2: Determination of Air Flow Temperature Profile

Once the flow streamlines and the velocity field are determined, the temperature profile within the flow is solved. The temperature of the incoming air (i.e., the inlet temperature) is specified to be the autoclave temperature at that given time, and the interior side walls of the autoclave permit the use of insulated boundary conditions. At the exit, one can impose a fully-developed boundary condition which indicates that the temperature is not changing in the flow direction. The surface of the cure assembly is at an initial surface temperature. This initial surface temperature can be used as the initial boundary condition. During the curing process the surface temperature of the composite assembly changes with time and therefore the calculation of the temperature profile within the air flow is repeated a number of times during the curing process.

Step 3: Determination of Cure Assembly Surface Temperature Gradient

Based on the calculated temperature profile in Step 2, the temperature gradient of the air is calculated on the surface of the cure assembly. The temperature gradient in this context is defined as the variation of the surface temperature along a line perpendicular to the surface of the solid body, and is mathematically represented as $$\frac{\partial T}{\partial n} \tag{2}$$

where n is the normal direction to the surface. Note that depending the temperature distribution in the air, the temperature gradient described in Equation 2 will vary over the surface of the curing assembly. This variation can be expressed as $$\frac{\partial T(\vec{r})}{\partial n} \tag{3}$$

where $\vec{r}$ describes a position vector in any co-ordinate system. After the temperature gradient distribution is calculated at the surface of the curing assembly, the heat transfer coefficient h is calculated throughout the surface of the curing assembly using the expression in Equation 3 as given below.

$$h(r) = k_{air} \frac{\left[\frac{\partial T(r)}{\partial n}\right]_s}{T_\infty - T_w(r)} \quad (4)$$

where $k_{air}$ is the thermal conductivity of the air, and s designates that the gradient is calculated at the surface of the solid body (i.e., curing assembly). The evaluated value of $h(\vec{r})$ enables it to be used as the boundary condition in the thermo-chemical model which is used to solve the temperature field within the composite material. This boundary condition is referred to as the third kind of boundary condition and can be expressed as $$k_{solid}\left[\frac{\partial T(r)}{\partial n}\right]_s + h(r)T(r) = h(r)T_\infty \quad (5)$$

where $k_{solid}$ is the thermal conductivity of the solid at the boundary (for details see M. N. Ozisik, "Heat Transfer: A Basic Approach", McGraw-Hill, Inc., 1985).

Step 4: Determination of the Curing Assembly Temperature Profile

Using the boundary conditions obtained from Step 3, the temperature distribution or profile within the curing assembly is determined. This temperature profile is obtained by solving time dependent governing equations for the conduction heat transfer considering the composite material, the bleeder, and the tool-plate. Also, depending on the configuration of the prepreg lay-up, the temperature profile may be determined from the anisotropic heat transfer equations (see, for example, M. N. Ozisik, "Heat Conduction", 2nd Ed, John Wiley & Sons, Inc. 1993). In the numerical algorithm, the present step essentially comprises a modified and extended form of the thermo-chemical model used in cure-control strategy of the parent U.S. patent, as described earlier. After the governing equations are solved, a recalculated curing assembly surface temperature profile can be determined. Depending on the numerical scheme this time step may be very small (i.e., 0.001–0.000001 seconds) so that an accurate and stable solution is obtained. Then, the recalculated curing assembly surface temperature profile can be used as the updated boundary condition for next time step, and Step 2 is repeated to obtain the new temperature profile in the air flow in the vicinity of the curing assembly. These steps (i.e., Steps 2-3-4) are repeated until the cure cycle is terminated as disclosed in the earlier U.S. Pat. No. 5,207,956.

Changes may be made in the construction and the operation of the various components, elements and assemblies described herein or in the steps or the sequence of steps of the methods described herein without departing from the spirit and scope of the invention as defined in the following claims.

What is claimed is:

1. A method for controlling a curing process for curing a composite material part in a curing vessel, comprising the steps of:

placing the composite material part in the curing vessel;

beginning the curing process of the composite material part by heating a gas within the curing vessel;

measuring an actual part temperature of the part during the curing process;

directly measuring during the curing process at least one additional real part parameter value other than actual part temperature; and adjusting the curing process when the additional real part parameter value is different from a predetermined acceptable value or range of values of the additional real part parameter.

2. The method of claim 1 wherein the step of adjusting the curing process further comprises comparing the actual part temperature to a predicted maximum part temperature and adjusting the curing process when the actual part temperature falls outside of a predetermined acceptable range about the predicted maximum part temperature.

3. The method of claim 1 wherein the curing vessel is further defined as an autoclave.

4. A method for controlling a curing process for curing a composite material part in a curing vessel, comprising the steps of:

placing the composite material part in the curing vessel;

beginning the curing process of the composite material part by heating a gas within the curing vessel;

measuring an actual part temperature of the part during the curing process;

directly measuring during the curing process a measured quantity other than actual part temperature which is related to actual degree of cure of the part; and adjusting the curing process when the measured quantity related to actual degree of cure is different from a predetermined acceptable value or range of values of degree of cure.

5. The method of claim 4 wherein the step of adjusting the curing process further comprises comparing the actual part temperature to a predicted maximum part temperature and adjusting the curing process when the actual part temperature falls outside of a predetermined acceptable range about the predicted maximum part temperature.

6. A method for controlling a curing process for curing a composite material part in a curing vessel, comprising the steps of:

placing the composite material part in the curing vessel;

beginning the curing process of the composite material part by heating a gas within the curing vessel;

measuring an actual part temperature of the part during the curing process;

directly measuring during the curing process a measured quantity other than actual part temperature which is related to actual viscosity of the part; and adjusting the curing process when the measured quantity related to actual viscosity is different from a predetermined acceptable value or range of values of viscosity.

7. The method of claim 6 wherein the step of adjusting the curing process further comprises comparing the actual part temperature to a predicted maximum part temperature and adjusting the curing process when the actual part temperature falls outside of a predetermined acceptable range about the predicted maximum part temperature.

8. A method for controlling a curing process for curing a composite material part in a curing vessel, comprising the steps of:

placing the composite material part in the curing vessel;

beginning the curing process of the composite material part by heating a gas within the curing vessel;

measuring an actual part temperature of the part during the curing process;

directly measuring during the curing process a measured quantity other than actual part temperature which is related to actual number of compacted plies of the part; and adjusting the curing process when the measured quantity related to actual number of compacted plies is different from a predetermined acceptable value or range of values of number of compacted plies.

9. The method of claim 8 wherein the step of adjusting the curing process further comprises comparing the actual part temperature to a predicted maximum part temperature and adjusting the curing process when the actual part temperature falls outside of a predetermined acceptable range about the predicted maximum part temperature.

10. A method for controlling a curing process of a composite material part in a curing vessel, the curing process using a heated gas, the part having at least one ply, the method comprising the steps of:

(a) providing an analytical model for calculating a predicted temperature of the part predicted to occur at a predetermined time during the curing process, the analytic model accounting for convective heat transfer between the heated gas within the curing vessel and the composite material part;

(b) measuring an actual maximum temperature of the part at the predetermined time during the curing process;

(c) comparing the predicted temperature to the actual maximum temperature;

(d) selecting a new cure cycle when the actual maximum temperature falls outside of an acceptable temperature range about the predicted temperature;

(e) adjusting an ambient temperature in the curing vessel in accordance with the new cure cycle;

(f) providing an analytic model for calculating a predicted resin viscosity of the part predicted to occur at a predetermined time during the curing process;

(g) calculating a predicted time-to-gel point for the part based on the predicted resin viscosity;

(h) measuring porosity of the part at the predetermined time during the curing process;

(i) predicting whether the porosity of the part will remain above a predetermined maximum acceptable level when the gel point is reached;

(j) increasing ambient pressure in the curing vessel by a predetermined increment when the porosity is predicted to remain above the predetermined maximum acceptable level when the gel point is reached;

(k) providing an analytic model for calculating a predicted number of compacted plies of the part predicted to occur at a predetermined time during the curing process;

(l) estimating an actual number of compacted plies of the part at the predetermined time during the curing process;

(m) comparing the predicted number of compacted plies to the actual number of compacted plies;

(n) adjusting the ambient pressure within the curing vessel by a predetermined increment when the actual number of compacted plies falls outside of a predetermined acceptable range;

(o) estimating an actual degree of cure of the part at a predetermined time during the curing process;

(p) comparing the actual degree of cure to a predetermined acceptable actual degree of cure;

(q) repeating steps a through p when the actual degree of cure falls below the acceptable actual degree of cure;

(r) providing, when the acceptable actual degree of cure has been achieved, an analytic model for determining when a predetermined acceptable theoretical degree of cure has been achieved; and (s) repeating steps o through r when the theoretical degree of cure is below the predetermined acceptable theoretical degree of cure.

11. The method of claim 10 wherein the composite material further comprises a graphite-epoxy laminate.

12. The method of claim 10 wherein the curing vessel is further defined as an autoclave.

13. A method for curing a composite material part in a curing vessel, comprising the steps of:

(a) obtaining initial property values for the composite material comprising the part wherein the part contains at least one ply;

(b) specifying an initial part temperature;

(c) determining an initial set of cure cycles;

(d) running a computer model simulation of each cure cycle in the initial set to predict the length of time which would be required for the cure cycle to satisfy a set of conditions wherein the set of conditions includes:
achieving a predetermined minimum acceptable degree of cure of the part;
compaction of all the plies of the part; and
maintenance of the maximum internal part temperature below a predetermined maximum value during the curing process;

(e) selecting, as an initial cure cycle, the cure cycle in the initial set of cure cycles which satisfied the set of conditions in the shortest time;

(f) disposing the composite material part within the curing vessel for curing;

(g) setting initial curing vessel process conditions at the temperature and pressure levels dictated by the initial cure cycle;

(h) beginning the curing process by heating a gas within the curing vessel;

(i) monitoring ambient levels of temperature and pressure within the curing vessel and adjusting the ambient levels as needed in accordance with the initial cure cycle;

(j) obtaining, at a predetermined time interval, real parameter values wherein the real parameters comprise:
maximum temperature of the part;
degree of cure of the part;
resin viscosity of the part;
porosity of the part; and
the number of compacted plies of the part;

(k) comparing the real parameter values for temperature, degree of cure, resin viscosity, porosity and number of compacted plies to predicted parameter values for temperature, degree of cure, resin viscosity, porosity and number of compacted plies predicted by the computer simulations of the initial cure cycle and wherein convective heat transfer between the heated gas in the curing vessel and the composite part is accounted for;

(l) selecting a new cure cycle when at least one of the real parameter values falls outside of predetermined acceptable ranges of the predicted parameter values predicted by the initial cure cycle wherein the new cure cycle is selected by following steps c, d and e;

(m) adjusting the curing vessel process conditions in accordance with the conditions dictated by the new cure cycle when a new cycle is selected; and (n) continuing to monitor the curing process of the part by repeating steps i through m until the composite part has achieved the predetermined acceptable degree of cure wherein the cure process is ended.

14. The method of claim 13 wherein the composite material further comprises a graphite-epoxy laminated material.

15. The method of claim 13 wherein the curing vessel is further defined as an autoclave.

* * * * *

UNITED STATES PATENT AND TRADEMARK OFFICE
CERTIFICATE OF CORRECTION

PATENT NO. : 5,453,226

DATED : September 26, 1995

INVENTOR(S) : Kline et al.

It is certified that error appears in the above-identified patent and that said Letters Patent is hereby corrected as shown below:

Title Page, ABSTRACT, line 14, after "within" please insert -- the --.

Column 1, line 10, after "abandoned" please insert -- , --.

Column 1, line 11, after "filed" please delete ",".

Column 8, line 58, after "depending" please insert -- on --.

Column 8, please delete Equation (3) and substitute therefor --
$$\frac{\partial T(\vec{r})}{\partial n}$$
--.

Column 9, please delete Equation (4) and substitute therefor --
$$h(\vec{r}) = k_{air} \frac{\left[\frac{\partial T(\vec{r})}{\partial n}\right]_s}{T_\infty - T_w(\vec{r})}$$
--.

Column 9, please delete Equation (5) and substitute therefor --
$$k_{solid} \left[\frac{\partial T(\vec{r})}{\partial n}\right]_s + h(\vec{r}) T(\vec{r}) = h(\vec{r}) T_\infty$$
--.

UNITED STATES PATENT AND TRADEMARK OFFICE
CERTIFICATE OF CORRECTION

PATENT NO. : 5,453,226
DATED : September 26, 1995
INVENTOR(S) : Kline et al.

It is certified that error appears in the above-indentified patent and that said Letters Patent is hereby corrected as shown below:

Column 9, line 46. after "condition for" please insert --the--.

Signed and Sealed this

Twentieth Day of February, 1996

Attest:

BRUCE LEHMAN

*Attesting Officer*    *Commissioner of Patents and Trademarks*